United States Patent Office 2,878,278
Patented Mar. 17, 1959

2,878,278
METHOD OF MAKING ESTERS OF HALO-ARYLOXY FATTY ACIDS

Jean B. Bond, Nitro, W. Va., assignor to Monsanto Chemical Company, St. Louis, Mo., a corporation of Delaware No Drawing. Application March 23, 1955
Serial No. 496,319

5 Claims. (Cl. 260—473)

The present invention relates to a new method of making esters of haloaryloxy fatty acids. These esters, having one or more halogen substituents in an aryloxy group, comprise important herbicides.

It is an object of the present invention to provide a new improved method for the manufacture of esters of haloaryloxy fatty acids. A particular object is to provide an improved method for the manufacture of alpha-phenoxy fatty acids containing halogen as a ring substituent. Another particular object of the invention is to provide a method for condensing a halophenate with esters of halofatty acids. Other and further objects are to provide a cheap direct method for the manufacture of esters and to simplify the procedure by eliminating steps heretofore considered necessary. Still another object is to provide a class of alpha-halofatty acid esters which react especially well by the new procedure. Still another object is to provide a method for manufacture of haloaryloxy fatty acids from halophenols in high yields. Other and further objects will be apparent from the description following.

The presence of halogen in the aromatic ring inhibits the reactivity of phenols so that preparation of derivatives often is difficult. However, it has now been found that conversion of halophenols directly to esters of haloaryloxy fatty acids takes place readily on heating the halophenol and an ester of an alpha-halofatty acid in the presence of an alkali metal carbonate. The carbonate should be used in an amount at least equivalent to the halophenol. By equivalent amount is meant the calculated neutralization equivalent, not the mole equivalent, but an excess has no deleterious effect. Heating the halophenol with an alkali metal carbonate is not equivalent to reacting a preformed alkali metal phenate. The latter are insoluble in organic solvents and provide thick suspensions difficult to process whereas heating the halophenol in an organic solvent in the presence of alkali metal carbonate produces only a slight haze. Sodium carbonate is preferred although potassium carbonate and potassium or sodium bicarbonate are also suitable.

Dry reagents are critical for success. The halophenol, carbonate and ester should be perfectly dry. A convenient method for drying the halophenol when only aqueous solutions of the sodium salt are available is to precipitate the free phenol from solution by acidification, separate the water, add sodium carbonate together with a water entraining agent and heat to distill off water with the entraining agent. For example, trichlorophenol absorbs about 8% water. A non polar solvent and sodium carbonate are added to the phenol and the solvent distilled until no more water separates. The result is a thin suspension of sodium carbonate and probably a small amount of the sodium salt of the phenol. Solvents boiling in the range of 150–200° C. are preferred since removal of water is easier than with lower boiling materials. On the other hand there is a practical upper limit since heating above 200° C. darkens the product. A practical working range for carrying out the reaction is 130–200° C.

Water is produced as a by-product during the condensation. Water would be obtained from the by-product carbonic acid whether the reaction is envisaged as taking place through gradual formation of the alkali metal phenate from the phenol and carbonate or through direct condensation of the phenol and neutralization of by-product acid by the carbonate. The removal of by-product water is distinctly advantageous. By so doing the yields are significantly improved. One way of accomplishing this is to continue azeotroping water during the condensation.

Esters of alpha-halofatty acids containing at least six carbon atoms in the ester forming group react especially well in the process. These may be represented by the general formula

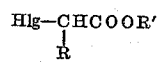

where Hlg represents halogen, R represents a lower alkyl group or hydrogen and R' represents an ester forming group containing at least six carbon atoms. Typical examples comprise esters of monochloroacetic acid, monobromoacetic acid, alpha-chloropropionic acid and alpha-bromopropionic acid. Typical examples of the ester forming group R' include butoxyethoxypropyl, octyl, isooctyl, butoxyethyl, 1-phenoxy-2-propyl, 1(4-butylphenoxy)-2-propyl, (4-secondary butylphenoxy)propoxypropyl, butoxypropoxypropyl, 1-butoxy-2-propyl, 1-propoxy-2-propyl, 1-isopropoxy-2-propyl, propoxypropoxypropyl, ethoxyethoxyethyl, butoxyethoxyethyl, phenoxyethoxyethyl, and butoxypropyl radicals. Examples of suitable lower esters comprise the ethyl, propyl, isopropyl, butyl and amyl esters.

The esters of halofatty acids are prepared by conventional esterification procedure using a non polar solvent and azeotroping the by-product water. Following stripping off the solvent, the crude ester remaining is used without further purification. If desired the product may be purified as for example by distillation. For example, condensation of 95 parts by weight of monochloroacetic acid, 187 parts by weight of butoxyethoxypropanol and 0.2 part by weight of sulfuric acid at 110° C. under 35 mm. pressure in toluene results in a substantially quantitative yield of butoxyethoxypropyl chloroacetate. Similarly, the butoxyethyl esters are obtained in yields ranging from 98% to essentially quantitative. Another intermediate, n-octyl chloroacetate, was prepared by heating 199 parts by weight of monochloroacetic acid, 260 parts by weight of n-octyl alcohol and 87 parts by weight of toluene. The theoretical amount of water was collected after heating for about 3 hours at 134–140° C. Heating was continued for about an hour longer while stripping out the toluene. A 98% yield of the ester was obtained as a light yellow liquid. The butoxyethoxypropyl ester of alpha-chloropropionic acid was prepared in 97% yield by heating alpha-chloropropionic acid and butoxyethoxypropanol in toluene with a little sulfuric acid. If desired an excess of the alcohol may be used and left to serve as solvent for the subsequent condensation.

By way of example the following halophenols may be employed advantageously in the new procedure: 4-chlorophenol, 4-bromophenol, 4-iodophenol, 2,4-dichloro-1-naphthol, pentachlorophenol, methyl-2,4-dichlorophenol, 2,4-dichlorophenol, 2,4,5-trichlorophenol, 2-methyl-4-chlorophenol, 2-chloro-4-ethoxyphenol, 2-chlorophenol, 3-chlorophenol, 2,6-dichlorophenol, 2,4,6-trichlorophenol, 2-bromophenol, 2,4-dibromophenol, 2,3,4,6-tetrachlorophenol and 2,4-difluorophenol. While the preferred procedure is to remove by-product water continuously during the condensation, good yields may still be obtained by refluxing a solution of the phenol in a non-polar solvent in the presence of sodium carbonate. The choice of the particular solvent will of course vary depending upon the reactants. Other solvents besides the alcohols and ether alcohols mentioned above comprise ortho-dichlorobenzene, meta-dichlorobenzene, para-dichlorobenzene, monochlorobenzene, 1,2,3-trichlorobenzene, 1,2,4-trichlorobenzene, ortho-xylene, para-xylene, mesitylene, cumene, ortho-chlorotoluene, meta-chlorotoluene, para-chlorotoluene, diethyl benzene, tetramethyl urea and kerosene.

The following examples illustrate the principles of the invention in detail and are to be taken as illustrative, not limitative.

*Example 1*

A glass of glass-lined reactor was fitted with a stirrer, a take-off to a receiver and a condenser. The reactor was charged with 49.4 parts by weight of trichlorophenol, 13.3 parts by weight of sodium carbonate and 265 parts by weight of orthene. The mixture was heated and stirred for about 2 hours while maintaining a slow rate of orthene distillation. The mixture was then thoroughly dry and to it was added 67.5 parts by weight of butoxyethoxypropyl chloroacetate. Heating was continued for about 2 hours while maintaining a slow rate of orthene distillation. During the reaction the volume was maintained substantially constant by the addition of orthene. The reaction mixture was then cooled, by-product sodium chloride filtered off and the orthene removed from the filtrate by distillation until the pot temperature was about 200° C. Heating was then continued in vacuo. In this manner the butoxyethoxypropyl ester of 2,4,5-trichlorophenoxyacetic acid is frequently obtained in yields of 100–104 parts by weight as compared to theoretical yield of 106 parts by weight.

Substituting 2,4-dichlorophenol for trichlorophenol in the same molecular proportion (the foregoing represents a 0.25 molecular proportion run) results in the butoxyethoxypropyl ester of 2,4-dichlorophenoxyacetic acid. In this case it is desirable to increase the heating period to 4 hours in order to obtain optimum yields.

Similarly, by substituting 48.6 parts by weight of butoxyethyl chloroacetate for the butoxyethoxypropyl acetate in the foregoing procedure, the butoxyethyl ester of 2,4,5-trichlorophenoxyacetic acid is produced. Again a 4 hour heating period is preferable. The product is obtained in good yields although conversion is somewhat lower than in the case of the butoxyethoxypropyl ester.

Replacing the chloroacetate in the foregoing procedure by 71 parts by weight of butoxyethoxypropyl alpha-chloropropionate results in the formation of the butoxyethoxypropyl ester of alpha-2,4,5-trichlorophenoxypropionic acid.

The butoxyethoxypropyl ester of 2,6-dichlorophenoxyacetic acid is prepared by replacing the trichlorophenol by 2,6-dichlorophenol on an equal molar basis and subjected to reaction as described.

*Example 2*

Into a reactor as described in Example 1 there was charged 49.4 parts by weight of trichlorophenol, 13.3 parts by weight of sodium carbonate and 300 parts by weight of orthene. This mixture was dried in the manner already described and 52 parts by weight of n-octyl chloroacetate added thereto. The reaction mixture was thereafter heated for 2 hours at about 170° C. during which by-product water was separated. The reaction mixture was then cooled to room temperature, the sodium chloride filtered off and the orthene removed by distillation to yield 96% of the theoretical quantity of the octyl ester of 2,4,5-trichlorophenoxyacetic acid.

*Example 3*

Into a reactor as described in Example 1 was charged 49.4 parts by weight of trichlorophenol, 13.3 parts by weight of sodium carbonate and 220 parts by weight of monochlorobenzene. The charge was heated for about an hour at 135° C. while slowly distilling off a portion of the chlorobenzene in order to remove all traces of moisture. Then a solution of 65.5 parts by weight of butoxyethoxypropyl chloroacetate in 110 parts by weight of monochlorobenzene was added and heating continued for about 75 minutes while maintaining a slow distillation of monochlorobenzene. A total of about 194 parts by weight of monochlorobenzene was distilled off and then heating continued for 4 hours under reflux. The reaction mixture was then stripped of remaining solvent by heating in vacuo to obtain substantially 103 parts by weight of the butoxyethoxypropyl ester of 2,4,5-trichlorophenoxyacetic acid.

*Example 4*

A reactor equipped with a stirrer, thermometer, condenser, feed line and Dean Starke moisture trap, was charged with 99.0 parts by weight of trichlorophenol, 26.6 parts by weight of sodium carbonate and about 200 parts by weight of butoxyethoxypropyl alcohol. The mixture was heated at 165° C. in vacuo and 4.3 parts by weight of water stripped out. To the mixture, now thoroughly dry, was added 134.0 parts by weight of butoxyethoxypropyl chloroacetate over a 15 minute period at a pot temperature of 140° C. The heating was increased until the temperature was 160° C., held there for 2 hours, then discontinued and the reaction mixture cooled to 25° C. By-product sodium chloride was filtered off, washed with benzene and the washings added to the filtrate. After drying the benzene and butoxyethoxypropyl alcohol were removed by distillation in vacuo to yield 203 parts by weight of the butoxyethoxypropyl ester of 2,4,5-trichlorophenoxyacetic acid.

If the free haloaryloxy acids or salts are desired they may be obtained by hydrolysis of the esters. Heating with aqueous sodium hydroxide is effective for this purpose.

It is intended to cover all changes and modifications of the examples of the invention herein chosen for purposes of disclosure which do not constitute departures from the spirit and scope of the invention.

What is claimed is:

1. The method of making a halophenoxy fatty acid ester which comprises heating a free, dry halophenol with a dry ester of the structure

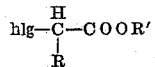

where hlg represents halogen, R represents a radical selected from the group consisting of hydrogen and lower alkyl radicals and R′ represents an ester forming radical containing at least 6 carbon atoms, the reaction being carried out in a water immiscible solvent in the presence of an alkali metal carbonate in an amount at least equal to the calculated neutralization equivalent of the phenol and continuously removing water from the reaction mixture.

2. The method of making a halophenoxy fatty acid ester which comprises heating at 130–200° C. dry 2,4,5-trichlorophenol with a dry ester of an alpha-chloro fatty acid containing at least 6 carbon atoms in the ester group in a water immiscible solvent in the presence of sodium carbonate in amount at least equivalent to the halophenol and removing water from the reaction mixture.

3. The method of making a halophenoxyacetic acid ester which comprises heating dry 2,4,5-trichlorophenol with the butoxyethoxypropyl ester of chloroacetic acid in a water immiscible solvent in the presence of sodium carbonate in amount at least equivalent to the halophenol and removing water from the reaction by azeotropic distillation.

4. The method of making a halophenoxyacetic acid ester which comprises heating dry 2,4,5-trichlorophenol with an octyl ester of chloroacetic acid in a water immiscible solvent in the presence of sodium carbonate in amount at least equivalent to the halophenol and removing water from the reaction by azeotropic distillation.

5. The method of making a halophenoxyacetic acid ester which comprises heating dry 2,4,5-trichlorophenol with the butoxyethyl ester of chloroacetic acid in a water immiscible solvent in the presence of sodium carbonate in amount at least equivalent to the halophenol and removing water from the reaction by azeotropic distillation.

References Cited in the file of this patent

UNITED STATES PATENTS 2,711,424 Suter _____ June 21, 1955
2,769,833 Weil _____ Nov. 6, 1956

OTHER REFERENCES

Newman et al.: J. Am. Chem. Soc. 69, 718, 722, 723 (1947).

Fieser et al.: "Organic Chemistry," page 623 (1956).